I. W. HUTCHIN.
Harrow.
No. 166,528. Patented Aug. 10, 1875.
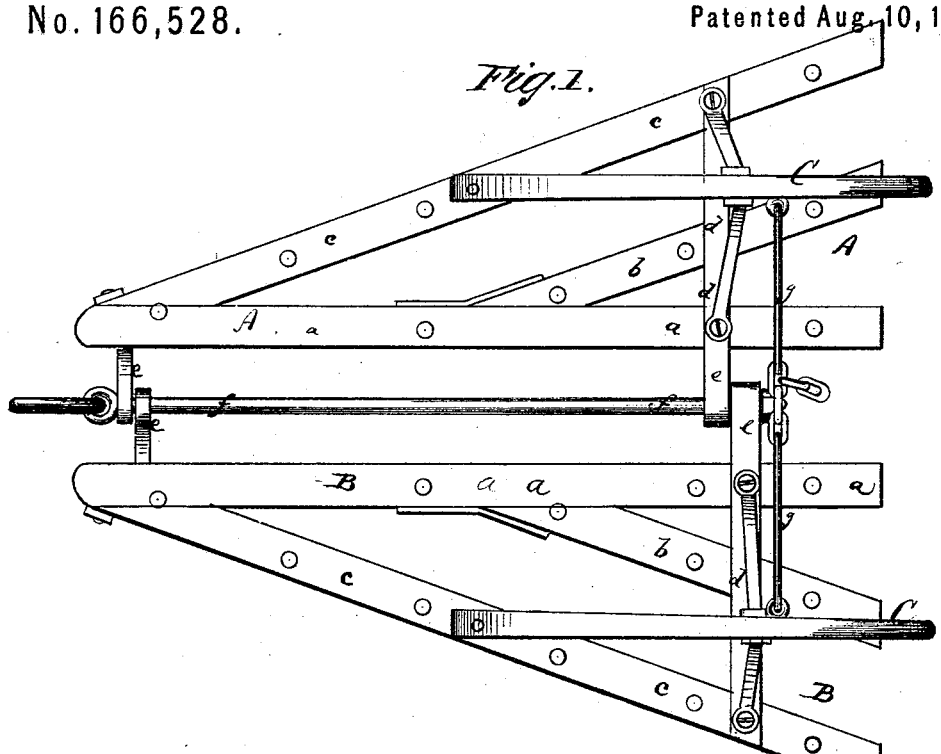
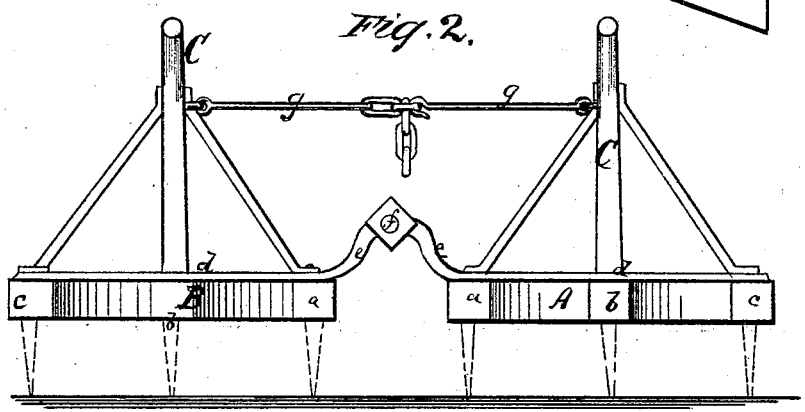
Witnesses:
John Becker
A. F. Terry
Inventor:
Isaac W. Hutchin
per Munn &c.
Attorneys.

UNITED STATES PATENT OFFICE.

ISAAC W. HUTCHIN, OF CLINTON, ILLINOIS.

IMPROVEMENT IN HARROWS.

Specification forming part of Letters Patent No. 166,528, dated August 10, 1875; application filed April 17, 1875.

*To all whom it may concern:*

Be it known that I, ISAAC W. HUTCHIN, of Clinton, in the county of DeWitt and State of Illinois, have invented a new and Improved Harrow; and I do hereby declare that the following is a full, clear, and exact description thereof, which will enable others skilled in the art to make and use the same, reference being had to the accompanying drawings forming part of this specification, in which—

Figure 1 represents a plan or top view of my improved harrow. Fig. 2 is a back view of the same.

Similar letters of reference indicate corresponding parts.

The invention consists in the construction and combination of parts hereinafter fully described, and specifically pointed out in the claim.

A B in the drawing are the two triangular sections of the harrow. Each is composed of three or more converging bars, $a$ $b$ $c$, connected by one or more transverse straps, $d$. The teeth are in suitable manner fastened in the bars. The two sections A B are hinged together so that their inner bars $a$ $a$ are parallel, as in Fig. 1. The hinges $e$ $e$ are raised above the surface of the sections, as shown in Fig. 2, and their connecting pivot or pin $f$ is thereby brought high enough from the ground to clear corn of ten or twelve inches in height.

The harrow can thus be used on fields of corn, straddling the corn between the sections so that the hinges pass over the same. Each section has a projecting handle, C, properly braced and fastened. The two handles are directly united by a chain or cord, $g$, which can be shortened so as to slightly raise the outer sides of the sections. This will cause the harrow to cut more in the center when harrowing corn-stalks. By slackening the chain, the sections will be brought flat upon the ground. The joints permit either section to be easily raised to clear stumps or stones, and quickly dropped when it has passed them.

When the harrow is to be conveyed to or from the field, it is reversed so as to rest on the handles, and can thus be drawn over meadows, fields, and roads without injuring them.

Having thus described my invention, I claim as new and desire to secure by Letters Patent—

In a sectional harrow, the raised hinges $e$ $e$, in combination with sections A B, fixed handles C C, and adjustable connecting-chains $g$ $g$, as specified.

I. W. HUTCHIN.

Witnesses:
　B. W. MONSON,
　WM. FULLER.